(12) United States Patent
Su

(10) Patent No.: US 9,199,655 B1
(45) Date of Patent: Dec. 1, 2015

(54) FOLDABLE CART

(71) Applicant: Chung-Hsiu Su, Kaohsiung (TW)

(72) Inventor: Chung-Hsiu Su, Kaohsiung (TW)

( * ) Notice: Subject to any disclaimer, the term of this patent is extended or adjusted under 35 U.S.C. 154(b) by 0 days.

(21) Appl. No.: 14/547,704

(22) Filed: Nov. 19, 2014

(51) Int. Cl.
*B62B 1/12* (2006.01)

(52) U.S. Cl.
CPC .................................... *B62B 1/125* (2013.01)

(58) Field of Classification Search
CPC ............ B62B 1/10; B62B 1/12; B62B 1/125; B62B 3/02; B62B 3/022
USPC ........ 280/47.27, 47.28, 47.29, 651, 652, 659, 280/654, 655
See application file for complete search history.

(56) References Cited

U.S. PATENT DOCUMENTS

| 5,468,005 | A | * | 11/1995 | Yang | ........................ | B62B 1/12 280/40 |
| 5,803,471 | A | * | 9/1998 | DeMars | .................. | B62B 1/125 280/40 |
| 6,053,514 | A | * | 4/2000 | Su | ............................. | B62B 1/12 280/40 |
| 7,097,183 | B1 | * | 8/2006 | Su | ............................. | B62B 1/12 280/40 |
| 8,465,029 | B2 | * | 6/2013 | Yang | ........................ | B62B 1/12 280/47.27 |

FOREIGN PATENT DOCUMENTS

TW         M483905         8/2014

* cited by examiner

*Primary Examiner* — John Walters
(74) *Attorney, Agent, or Firm* — Muncy, Geissler, Olds & Lowe, P.C.

(57) ABSTRACT

A foldable cart includes a frame mechanism and a control mechanism. The control mechanism can drive the frame mechanism to be in a collapsed state or an expanded state.

12 Claims, 12 Drawing Sheets

FOLDABLE CART

FIELD OF THE INVENTION

The invention relates to the field of hand trucks and carts, more particularly to a foldable cart.

BACKGROUND OF THE INVENTION

In general, a hand truck or a cart is used for carrying a relatively large amount of items at once. As shown in FIGS. 1 and 2, a foldable cart disclosed in Taiwanese Utility Model Patent Application No. 102221515 includes a frame mechanism 91, a wheeled rear support mechanism 92 that is mounted to a rear side of the frame mechanism 91, and two spaced-apart handle units 93 (only one is shown) that are connected to the main mechanism 91 and the wheeled rear support mechanism 92.

The frame mechanism 91 includes an upright main frame body 911, a carrier frame 912 that is pivotally connected to a bottom end of the main frame body 911 and that is foldable over the main frame body 911, two spaced-apart front wheel members 913 (only one is shown) that are respectively connected to two sides of the bottom end of the main frame body 911 in a pivotable manner relative to a left-right direction of the main frame body 911, and a gear unit 914 that is connected to the main frame body 911, the carrier frame 912 and the front wheel members 913.

When the frame mechanism 91 is in a collapsed state, the carrier frame 912 is folded upward over a front side of the main frame body 911, and the front wheel members 913 are situated at a rear side of the main frame body 911 in an unrollable manner relative to a front-rear direction of the main frame body 911. When the frame mechanism 91 is in an expanded state, the carrier frame 912 is pivoted forward away from the front side of the main frame body 911, and the front wheel members 913 are placed away from the rear side of the main frame body 911 in a rollable manner in the front-rear direction of the main frame body 911.

The wheeled rear support mechanism 92 is movable between a supporting position where the wheeled rear support mechanism 92 is unfolded to roll on a ground, and a fully folded position where the wheeled rear support mechanism 92 is folded over the main frame body 911 to move away from the ground. The handle units 93 are rotatably connected to the main frame body 911 and capable of driving respectively the front wheel members 913 to be pivotable relative to the left-right direction of the main frame body 911. In addition, the handle units 93 are connected to the gear unit 914 so as to drive rotation of the carrier frame 912. As such, the handle units 93 can enable the frame mechanism 91 to vary between the collapsed state and the expanded state.

Accordingly, after the frame mechanism 91 is collapsed, the foldable cart can occupy relatively small storage space and be conveniently stored.

SUMMARY OF THE INVENTION

An object of the present invention is to provide a foldable cart that is conveniently operable and storable, and that occupies relatively small storage space.

According to the present invention, a foldable cart includes a frame mechanism and a control mechanism.

The frame mechanism includes a main frame body, a carrier and two spaced-apart wheel members.

The main frame body has two spaced-apart upright first pipes, two second pipes respectively and telescopically inserted into the first pipes, and two third pipes respectively connected to bottom ends of the first pipes.

The carrier is rotatably connected to bottom ends of the third pipes.

The wheel members are respectively connected to and pivotable about the third pipes and are connected to the carrier for pivoting in a simultaneous manner with a rotating movement of the carrier.

The control mechanism includes two drive units for rotating the carrier. Each of the drive units corresponds to one of the first pipes and one of the second pipes, and includes a driven gear member and a driving rack member.

The driven gear member is drivingly connected to the carrier for the rotation of the carrier and is disposed below the corresponding one of the first pipes.

The driving rack member is disposed inside the corresponding one of the first pipes in an upward and downward movable manner and is connected to a bottom end of the corresponding one of the second pipes to move along therewith. The driving rack member is meshable with the driven gear member to drive the driven gear member.

BRIEF DESCRIPTION OF THE DRAWINGS

Other features and advantages of the present invention will become apparent in the following detailed description of an embodiment with reference to the accompanying drawings, of which.

DETAILED DESCRIPTION OF THE EMBODIMENT

Figure 1:
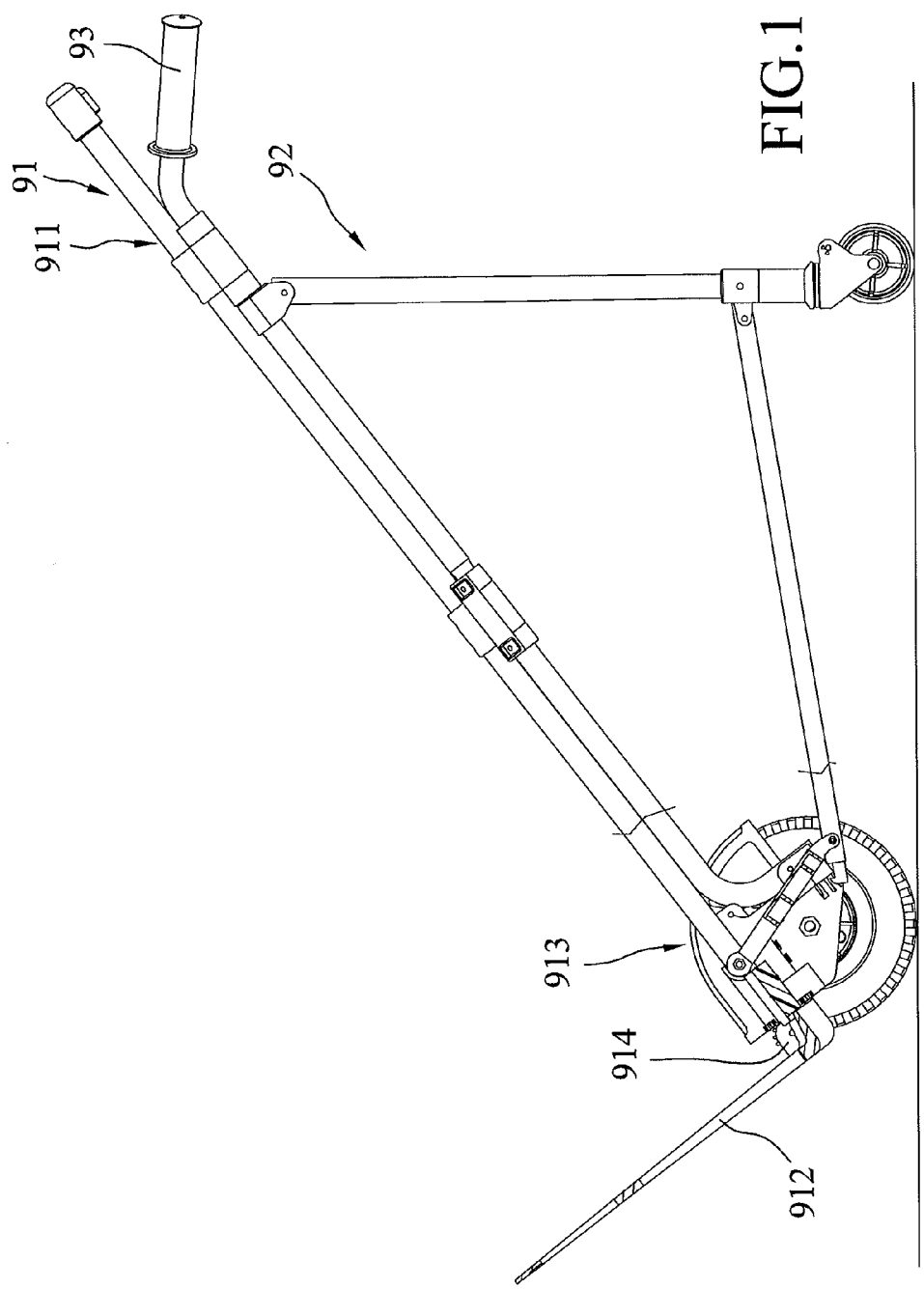
FIG. 1 is a schematic side view illustrating a main frame body of a foldable cart disclosed in Taiwanese Utility Model Patent Application No. 102221515 in an expanded state.
Figure 2:
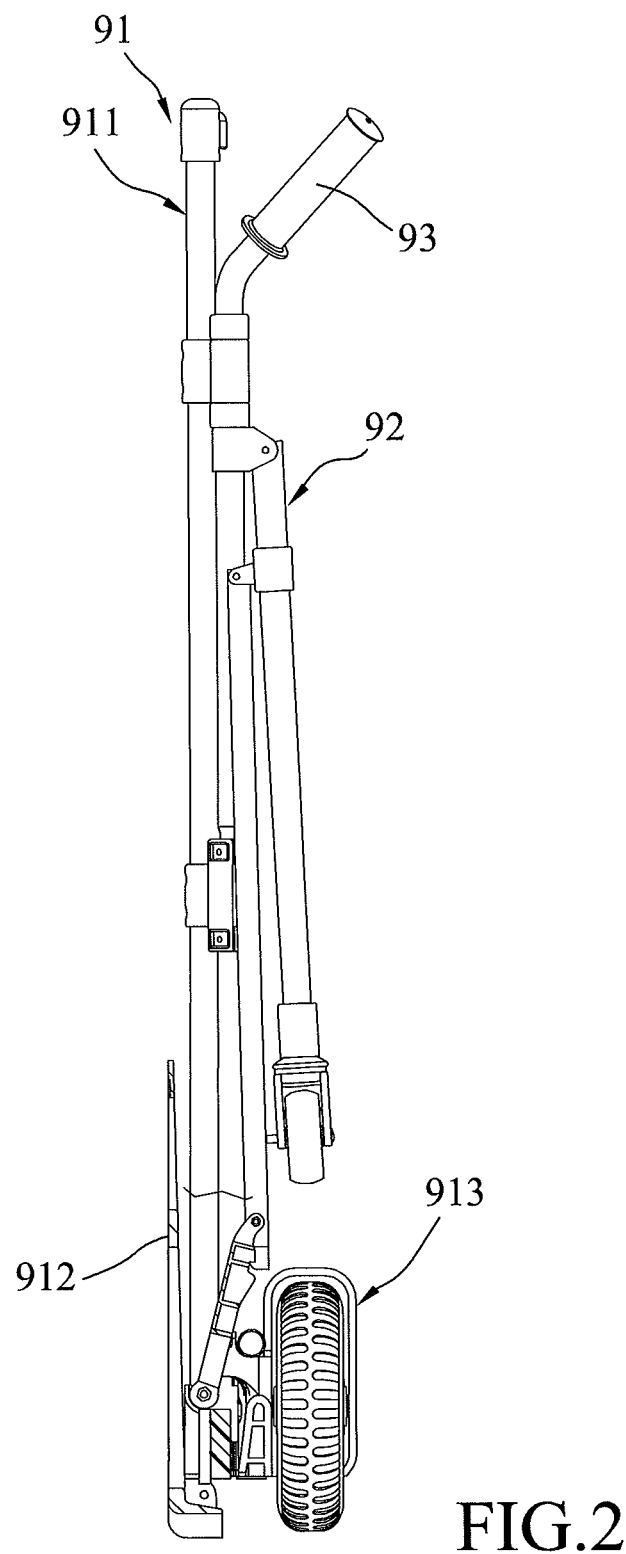
FIG. 2 is a view similar to FIG. 1, illustrating the frame body of the foldable cart in a collapsed state.
Figure 3:
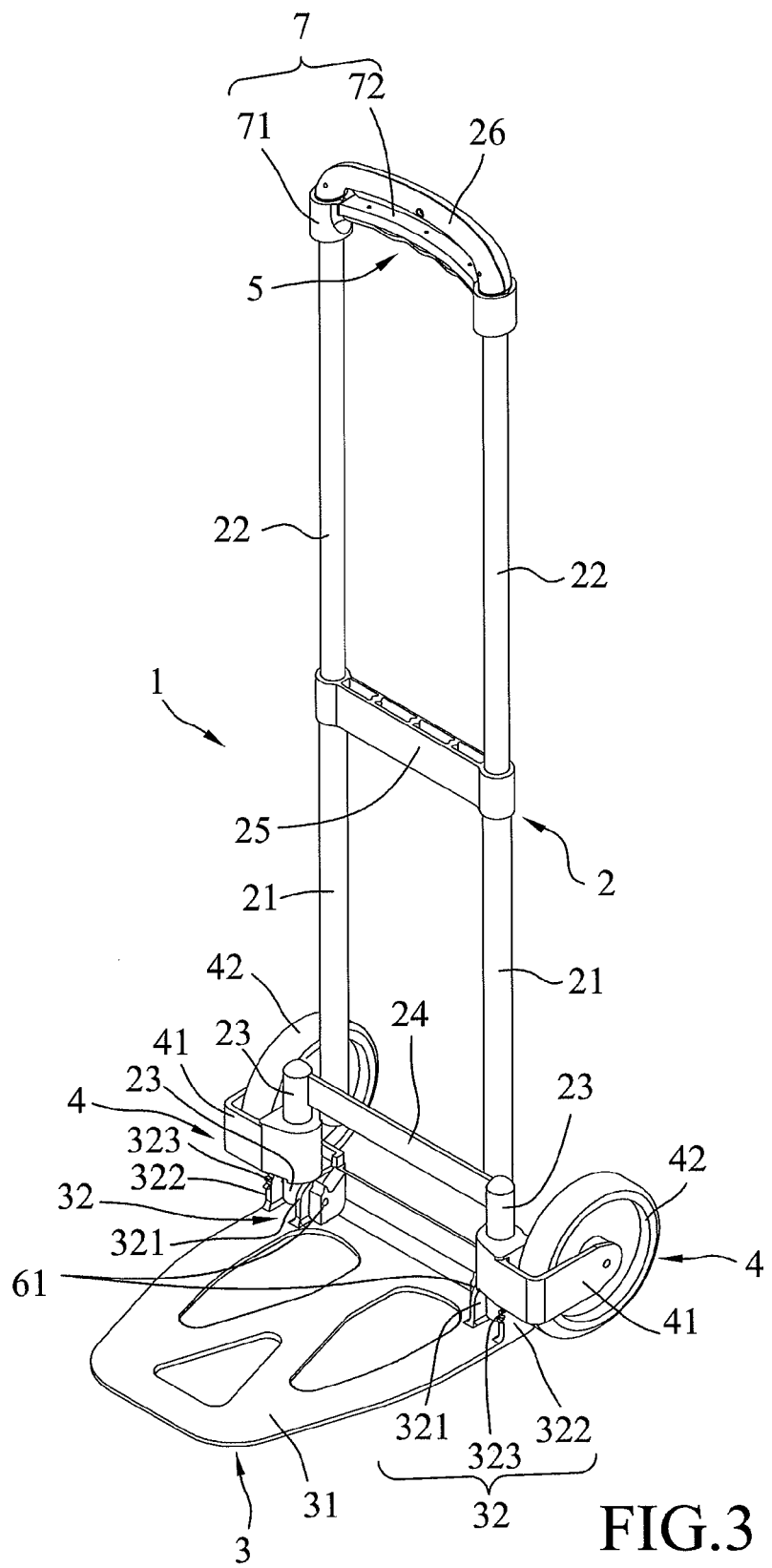
FIG. 3 is a perspective view illustrating an embodiment of a foldable cart according to the present invention in an unfolded state.
Figure 4:
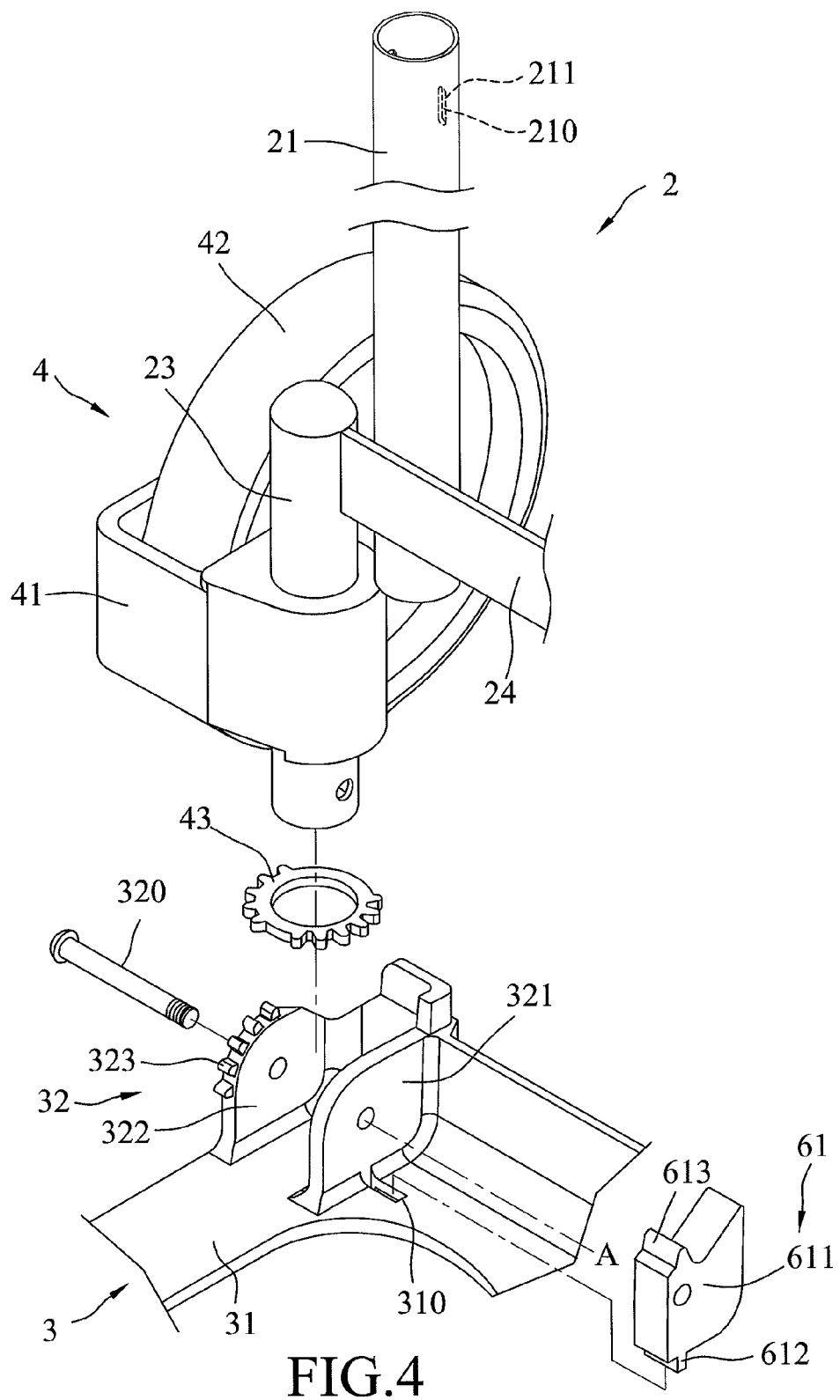
FIG. 4 is a fragmentary exploded perspective view illustrating a structural relationship among a main frame body, a carrier and a wheel member of a frame mechanism of the embodiment.
Figure 5:
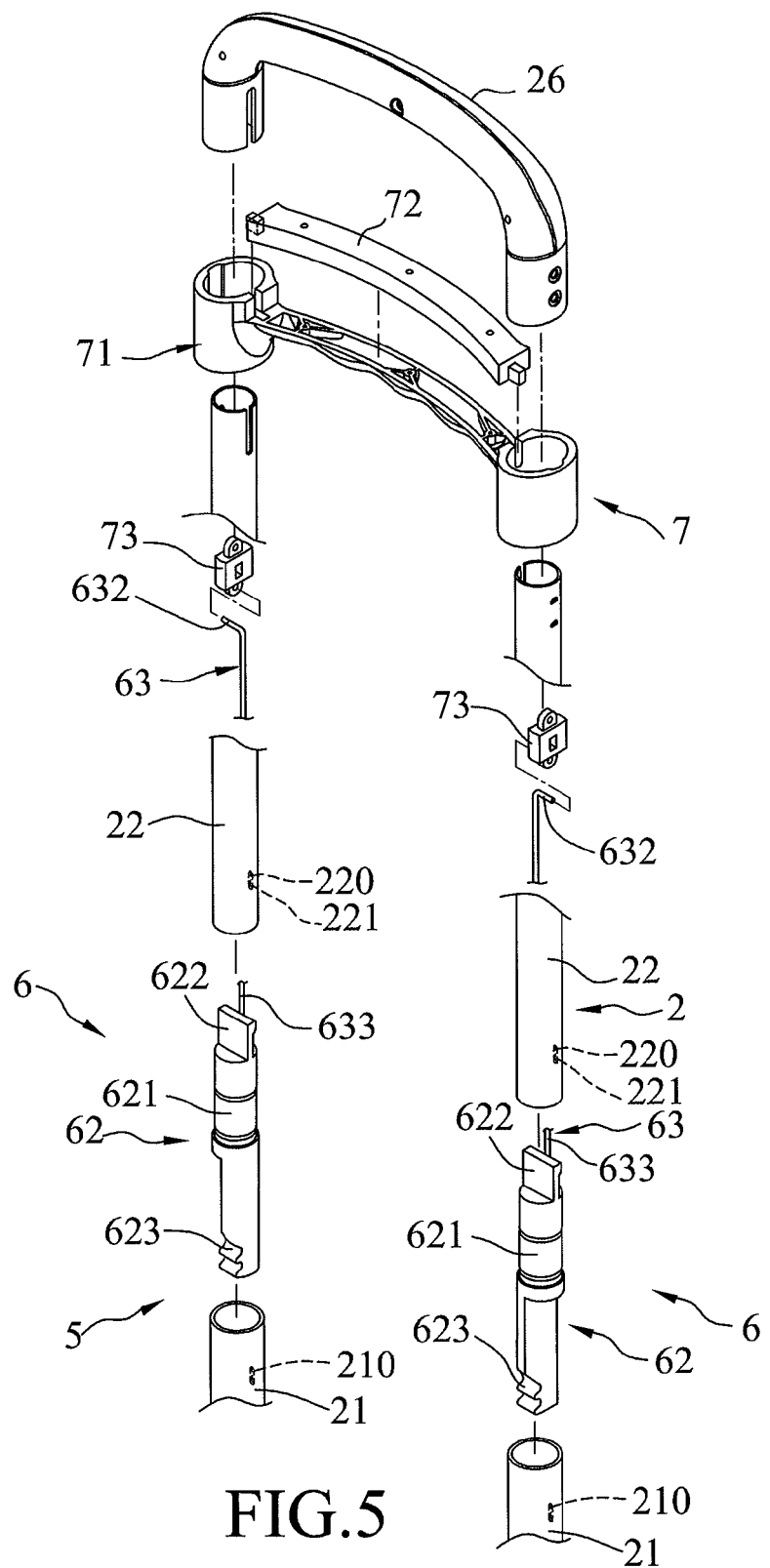
FIG. 5 is a fragmentary exploded perspective view illustrating a relationship between a control mechanism and the frame mechanism of the embodiment.

Referring to FIGS. 3 to 5, an embodiment of a foldable cart according to the present invention is illustrated. The foldable cart includes a frame mechanism 1 and a control mechanism 5.

The frame mechanism 1 includes a main frame body 2, a carrier 3 and two spaced-apart wheel members 4.

The main frame body 2 has two spaced-apart upright first pipes 21, two second pipes 22 that are respectively and telescopically inserted into the first pipes 21, two third pipes 23 that are respectively connected to bottom ends of the first pipes 21, a first cross bar 24 that is connected to the third pipes 23 and the bottom ends of the first pipes 21, a second cross bar 25 that is connected to top ends of the first pipes 21, and a handle member 26 that is connected to the second pipes 22.

In this embodiment, the first pipes 21 respectively have first positioning holes 210 proximate to the top ends of the first pipes 21, respectively. The second pipes 22 respectively have second positioning holes 220 proximate to bottom ends of the second pipes 22, respectively. Specifically, each of the first pipes 21 further has a first hole edge 211 (only one is shown in FIG. 4) that bounds a corresponding one of the first positioning holes 210. Each of the second pipes 22 further has a second hole edge 221 that bounds a corresponding one of the second positioning holes 220.

Figure 6:
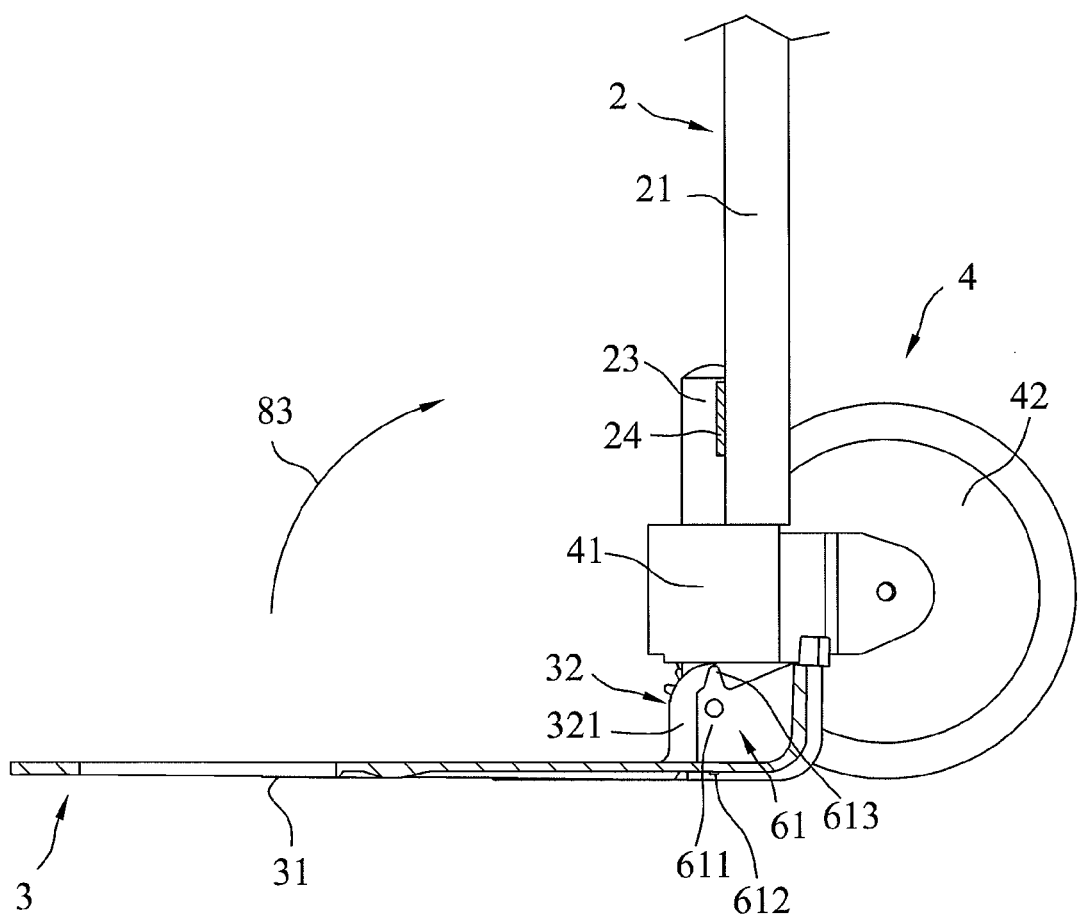
FIG. 6 is a fragmentary, partly sectional side view illustrating the frame mechanism of the embodiment in an expanded state.

With reference to FIGS. 3, 4 and 6, the carrier 3 is rotatably connected to bottom ends of the third pipes 23. In this embodiment, the carrier 3 includes a carrier body 31, two connection units 32 that are respectively disposed at two opposite sides of a rear portion of the carrier body 31 and that are respectively and pivotally connected to the bottom ends of the third pipes 23 through two pivot pins 320 (only one is shown), and two engaging slots 310 (only one is shown) that are formed in the carrier body 31 in proximity to the connection units 32, respectively. Each of the connection units 32 has parallel outer and inner connection walls 322, 321 that are pivotally connected to two opposite sides of the bottom end of the corresponding one of the third pipes 23. The outer connection wall 322 has a gear drive portion 323.

The wheel members 4 are respectively connected to and pivotable about the third pipes 23, and are connected to the carrier 3 for pivoting in a simultaneous manner with a rotating movement of the carrier 3. In this embodiment, each of the wheel members 4 includes a wheel bracket 41 that is connected to and pivotable about a corresponding one of the third pipes 23, a wheel 42 that is rollably mounted to the wheel bracket 41, and a gear 43 that is mounted on a bottom end of the wheel bracket 41 and that is meshed with the gear drive portion 323 of the outer connection wall 322.

With reference to FIGS. 3, 5, 7 and 8, the control mechanism 5 includes two drive units 6 for rotating the carrier 3, and an operating unit 7 that is connected between the second pipes 22 and located under the handle member 26. Each of the drive unit 6 corresponds to one of the first pipes 21 and one of the second pipes 22. In the following, since the drive units 6 are identical in structure and operation, only one drive unit 6 is illustrated for the sake of brevity.

In this embodiment, the drive unit 6 includes a driven gear member 61, a driving rack member 62, a lock member 63 and a resilient member 64.

With reference to FIGS. 3, 4, 5 and 6, the driven gear member 61 is drivingly connected to the carrier 3 for rotation of the carrier 3 and is disposed below the corresponding one of the first pipes 21. In this embodiment, the driven gear member 61 is rotatable about a rotation axis (A) of the carrier 3 (see FIG. 4). In addition, the driven gear member 61 has a rotator body 611 that is formed with a radial gear tooth 613 to mesh with the driving rack member 62 and a lever arm 612 that extends radially from the rotator body 611 to engage and rotate the carrier 3. Specifically, the rotator body 611 of the driven gear member 61 is disposed in proximity to the inner connection wall 321. In such an arrangement, the engaging slot 310 can receive engagingly the lever arm 612.

Figure 7:
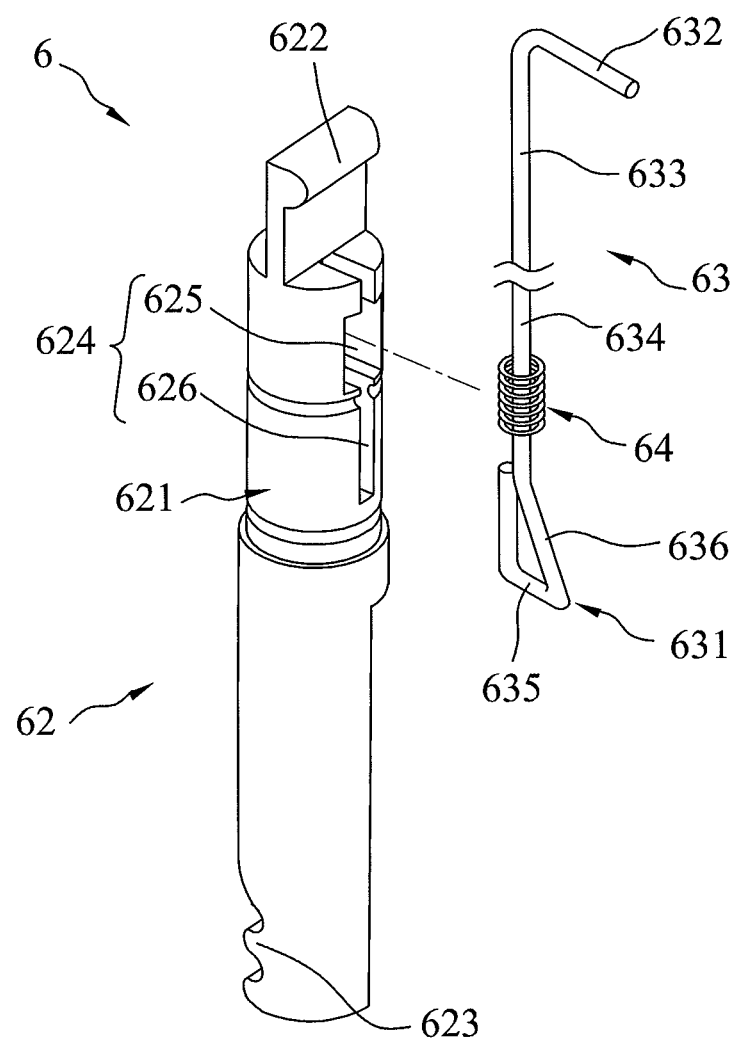
FIG. 7 is a fragmentary exploded perspective view illustrating a drive unit of the control mechanism of the embodiment including a driving rack member, a lock member and a resilient member.
Figure 8:
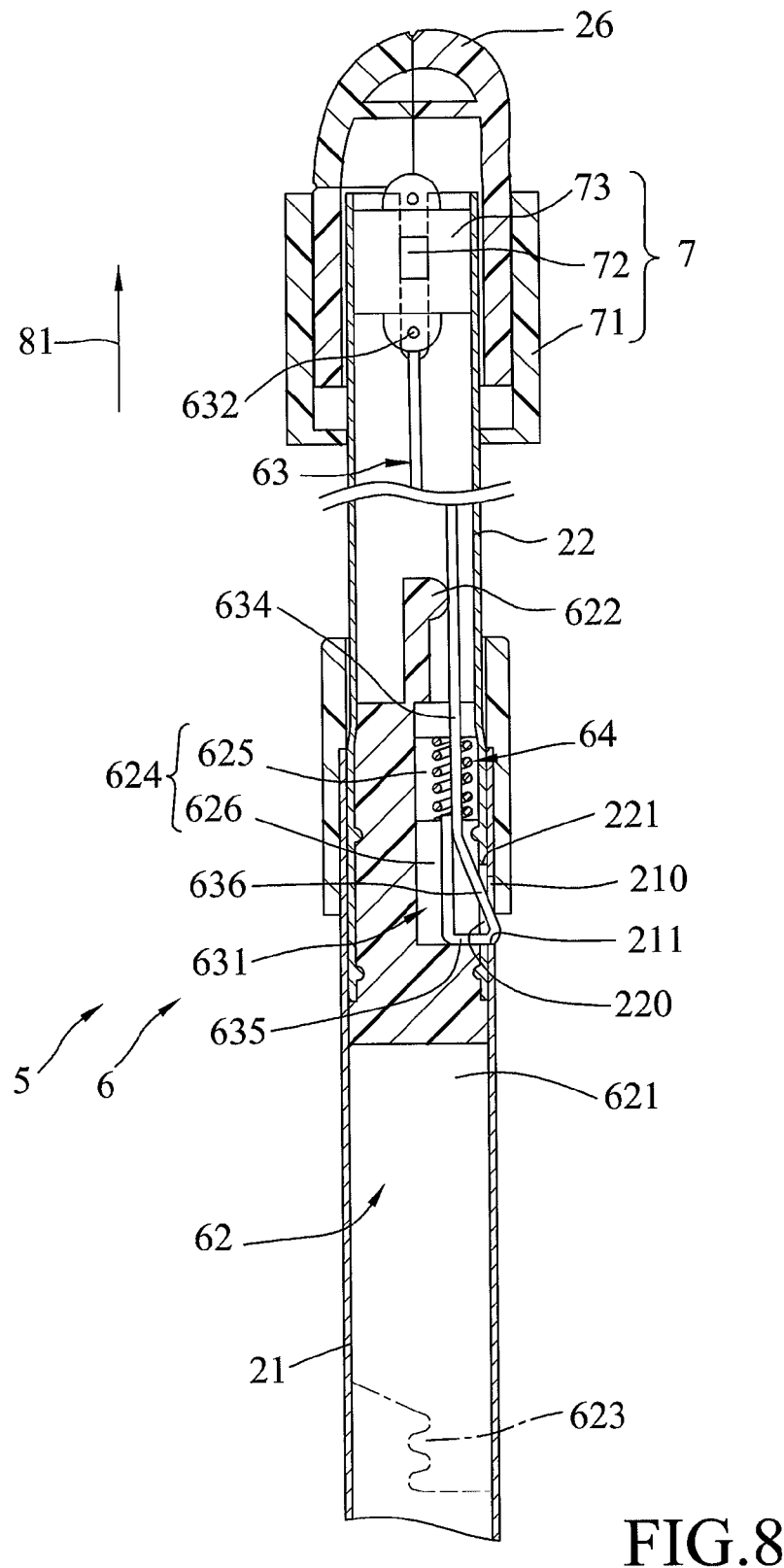
FIG. 8 is a fragmentary sectional view illustrating a structural relationship between the main frame mechanism and the control mechanism of the embodiment.

With reference to FIGS. 5, 7 and 8, the driving rack member 62 is disposed inside the corresponding first pipe 21 in an upward and downward movable manner and is connected to a bottom end of the corresponding one of the second pipes 22 to move along therewith. The driving rack member 62 is meshable with the driven gear member 61 to drive the driven gear member 61. In this embodiment, the driving rack member 62 of the drive unit 6 has an insertion portion 621 that is inserted into the bottom end of the corresponding one of the second pipes 22, a push portion 622 that is extended upwardly from the insertion portion 621, and a rack portion 623 that extends downwardly from the insertion portion 621 to mesh with the radial gear tooth 613 of the driven gear member 61.

The lock member 63 of the drive unit 6 is disposed inside the corresponding one of the second pipes 22 and is engageable with the corresponding one of the first pipes 21 to prevent the corresponding one of the second pipes 22 from moving relative to the corresponding first pipe 21. In this embodiment, the lock member 63 has a hook portion 631 that protrudes resiliently into the corresponding second positioning hole 220, an installation portion 632 that is disposed above the hook portion 631, and an intermediate portion 633 that interconnects the hook portion 631 and the installation portion 632. The hook portion 631 has a bottom engaging segment 635 and a guide segment 636 that extends upwardly and inclinedly from the bottom engaging segment 635. As an example, the hook portion 631 further has a resilient straight segment 634 that extends downwardly from a bottom end of the intermediate portion 633 toward the bottom engaging segment 635 in connection with the guide segment 636. The resilient straight segment 634 has an upper section that abuts against the push portion 622 of the driving rack member 62, and a lower section that is resiliently bendable relative to the upper section and that is connected to the guide segment 636. Specifically, the insertion portion 621 of the driving rack member 62 has a mounting space 624 for the hook portion 631 of the lock member 63 to be mounted resiliently therein. The mounting space 624 of the insertion portion 621 has an upper compartment 625 and a lower compartment 626 communicated with the upper compartment 625. In this embodiment, the bottom engaging segment 635 and the guide segment 636 of the hook portion 631 of the lock member 63 are disposed in the second compartment 626.

In this embodiment, the resilient member 64 is sleeved on the straight segment 634 of the hook portion 631 of the lock member 63 and is disposed in the upper compartment 625 of the mounting space 624 of the insertion portion 621 of the driving rack member 62 to urge downward the hook portion 631. As an example, the resilient member 64 is a spring.

In this embodiment, the operating unit 7 is connected to the driving rack member 62 of the drive unit 6 through the lock member 63 and is operable to move upward or downward the driving rack member 62 in a movable manner relative to the handle member 26. Specifically, the operating unit 7 is connected to the installation portion 632 of the lock member 63 of the drive unit 6 and operates the lock member 63 to move along with the driving rack member 62 inside the corresponding second pipe 22.

As shown in FIGS. 5 and 8, the operating unit 7 includes a first grasping member 71 that is connected to the second pipes 22, a second grasping member 72 that is coupled to the first grasping member 71 and that has two opposite ends respectively inserted into the second pipes 22, and two moving members 73 that are respectively and movably inserted into the second pipes 22 and that are respectively engaged with the ends of the second grasping member 72. In this embodiment, the installation portion 632 of the lock member 63 of the drive unit 6 is inserted into a corresponding one of the moving members 73.

Figure 10:
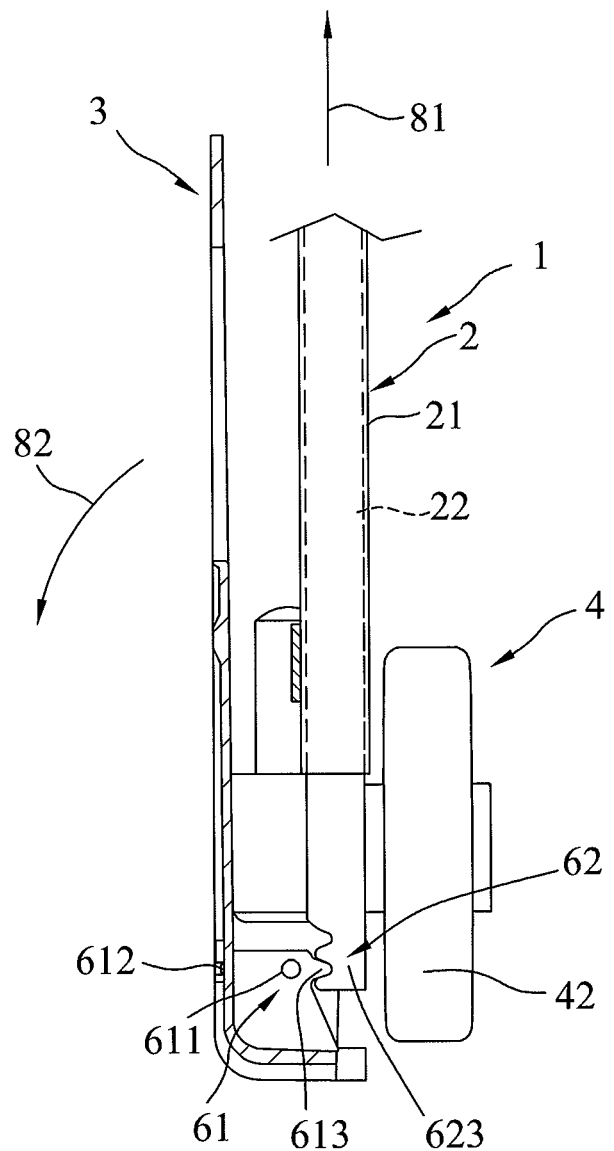
FIG. 10 is a fragmentary, partly sectional side view illustrating the frame mechanism of the embodiment in a collapsed state.
Figure 11:
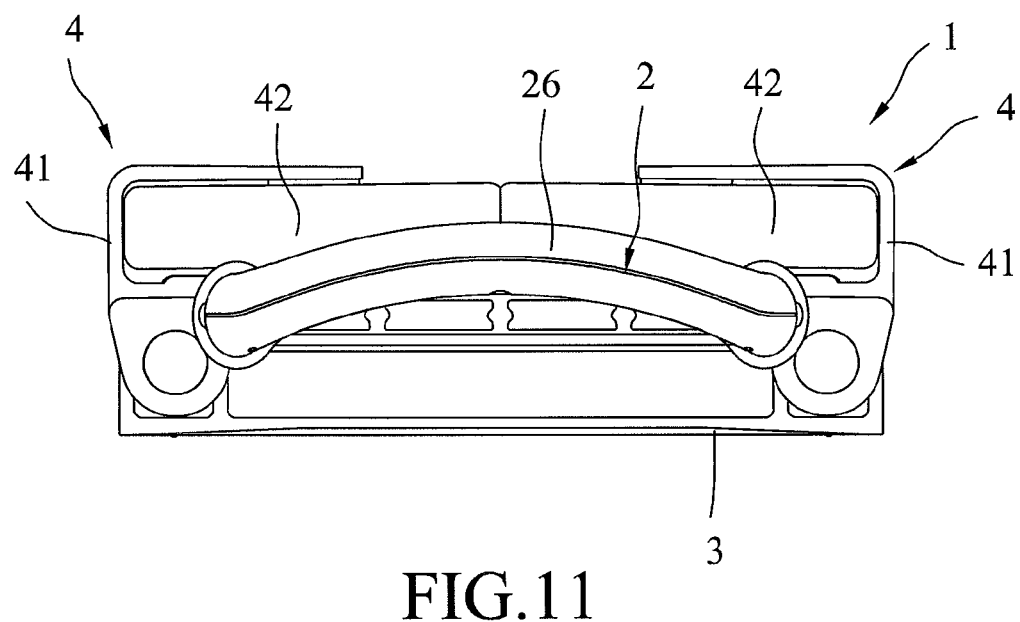
FIG. 11 is a top view illustrating the frame mechanism of the embodiment in the collapsed state.

With reference to FIGS. 10 and 11, when the frame mechanism 1 is in a collapsed state, the carrier 3 is folded over a front side of the main frame body 2, the wheel members 4 are non-rollably situated at a rear side of the main frame body 2, and the bottom ends of the second pipes 22 (only one is shown) are respectively proximate to the bottom ends of the first pipes 21 (only one is shown). As such, the driving rack member 62 extends through the bottom end of the corresponding first pipe 21. Accordingly, the rack portion 623 of the driving rack member 62 meshes with the radial gear tooth 613 of the driven gear member 61.

Figure 9:
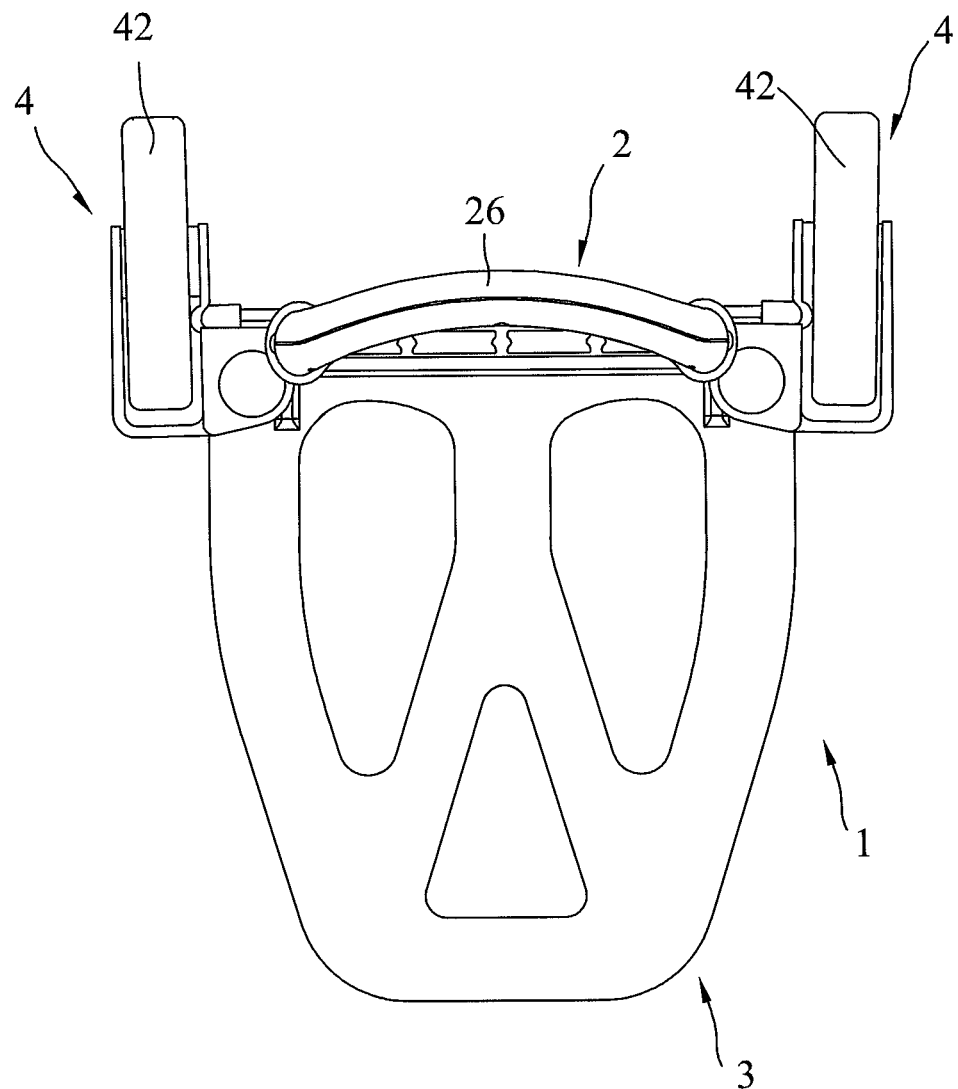
FIG. 9 is a top view illustrating the frame mechanism in the expanded state.

As shown in FIG. 10, when the handle member 26 (not shown) is pulled upward in a direction indicated by an arrow 81 to move upward the corresponding second pipe 22, the driving rack member 62 is moved upward and drives rotation of the driven gear member 61. As such, the carrier 3 is driven to rotate forward, downward and away from the front side of the main frame body 2 in a direction indicated by an arrow 82. Since the gear 43 meshes with the gear drive portion 323 of the outer connection wall 322 (see FIG. 4), the carrier 3 can bring the wheel members 4 (only one is shown) to displace away from the rear side of the main frame body 2, and thus the wheel member 4 are thereby permitted to roll forward or rearward (as shown in FIGS. 3, 6 and 9). In such a manner, the frame mechanism 1 is placed in an expanded state.

Specifically, when the corresponding second pipe 22 is moved upward to enable the bottom end of the corresponding second pipe 22 to move to a top end of the corresponding first pipe 21, the driving rack member 62 is moved upward and separated from the driven gear member 61.

Referring back to FIGS. 3, 5 and 8, when the frame mechanism 1 is in the expanded state, the corresponding second pipe 22 extends upwardly from the corresponding first pipe 21, such that the lock member 63 is engaged to the first positioning hole 210 of the corresponding first pipe 21 and the second positioning hole 220 of the corresponding second pipe 22 to prevent the corresponding second pipe 22 from being movable relative to the corresponding first pipe 21. Especially, when the second positioning hole 220 is in communication with the first positioning hole 210, the hook portion 631 of the lock member 63 springs outward from the second positioning hole 220 and engages the first positioning hole 210, such that the bottom engaging segment 635 of the hook portion 631 abuts against the first hole edge 211 of the corresponding first pipe 21 to prevent the corresponding second pipe 22 from moving downward relative to the corresponding first pipe 21. Accordingly, when the frame mechanism 1 is in the expanded state, the carrier 3 and the main frame body 2 can cooperatively support loads such that the foldable cart is convenient to carry the loads in a push-or-pull manner through rolling of the wheel members 4.

Figure 12:
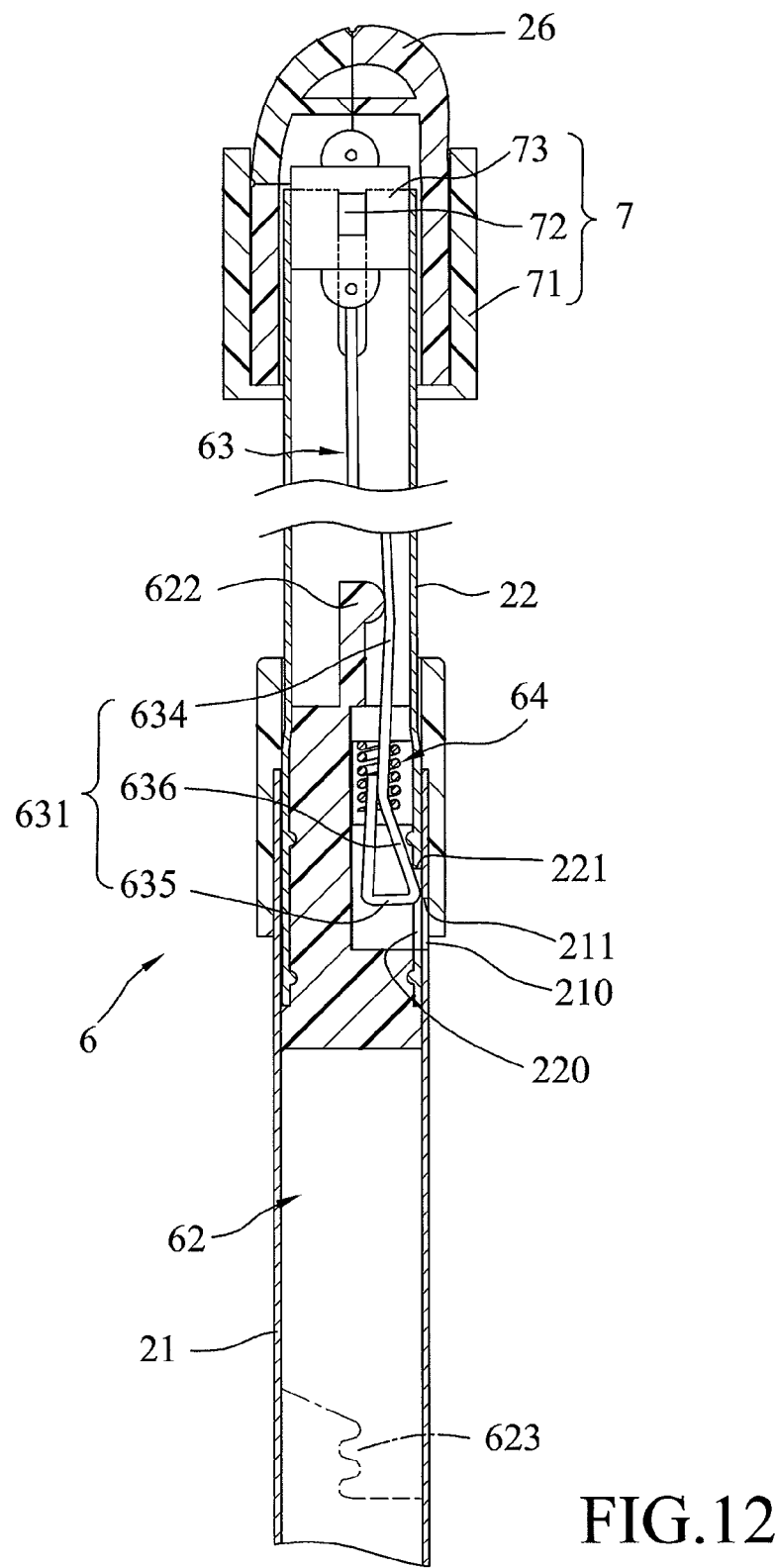
FIG. 12 is a fragmentary sectional view illustrating the lock member being moved in separation from a first hole of a first positioning pipe of the frame mechanism of the embodiment.

To store the foldable cart, the operating unit 7 is pulled upward in the direction indicated by the arrow 81 such that the lock member 63 is driven to move upward. As shown in FIG. 12, when the lock member 63 is pulled upward, the guide segment 636 of the hook portion 631 slidably abuts against the second hole edge 221 of the corresponding second pipe 22, such that the hook portion 631 is pressed inward to depart from the first positioning hole 210 of the corresponding first pipe 21 and to allow downward movement of the corresponding second pipe 22. Accordingly, the hook portion 631 pushes upward against the resilient member 64, such that the resilient member 64 has a restoring force.

With further reference to FIGS. 3, 6 and 10, while the operating unit 7 is pulled upward, the handle member 26 is pushed downwardly, such that the bottom end of the corresponding second pipe 22 is moved toward the bottom end of the corresponding first pipe 21. Accordingly, the driving rack member 62 is moved downwardly to extend out of the bottom end of the corresponding first pipe 21. When the driving rack member 62 drivingly meshes with the driven gear member 61, the driven gear member 61 is driven to rotate in a direction indicated by an arrow 83 (see FIG. 6), thereby enabling the carrier 3 to be moved in the direction indicated by the arrow 83 and to be folded over the front side of the main frame body 2. Simultaneously, the corresponding wheel member 4 is driven together with the movement of the carrier 3 and pivotally situated at the rear side of the main frame body 2. As a result, the frame mechanism 1 can be moved to the collapsed state (see FIGS. 10 and 11) to have a relatively small size, thereby occupying a relatively small storage space to be conveniently stored.

Furthermore, with further reference to FIGS. 7, 11 and 12, when the frame mechanism 1 is in the collapsed state, once pushing of the handle member 26 and pulling of the operating unit 7 are released, the restoring force of the resilient member 64 can urge downward the hook portion 631, such that the lock member 63 and the operating unit 7 are restored to move downward to their original positions.

While the present invention has been described in connection with what is considered the most practical embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A foldable cart comprising:
   a frame mechanism including
      a main frame body that has two spaced-apart upright first pipes, two second pipes respectively and telescopically inserted into said first pipes, and two third pipes respectively connected to bottom ends of said first pipes,
      a carrier that is rotatably connected to bottom ends of said third pipes, and
      two spaced-apart wheel members that are respectively connected to and pivotable about said third pipes and that are connected to said carrier for pivoting in a simultaneous manner with a rotating movement of said carrier; and
   a control mechanism including two drive units for rotating said carrier, each of said drive units corresponding to one of said first pipes and one of said second pipes, and including
      a driven gear member that is drivingly connected to said carrier for rotation of said carrier and that is disposed below the corresponding one of said first pipes, and
      a driving rack member that is disposed inside the corresponding one of said first pipes in an upward and downward movable manner and that is connected to a bottom end of the corresponding one of said second pipes to move along therewith, said driving rack member being meshable with said driven gear member to drive said driven gear member.

2. The foldable cart as claimed in claim 1, wherein, when said frame mechanism is in a collapsed state, said carrier is folded over a front side of said main frame body, said wheel members are non-rollably situated at a rear side of said main frame body, and said bottom ends of said second pipes are respectively proximate to said bottom ends of said first pipes such that said driving rack members respectively mesh with said driven gear members; and wherein, when said second pipes are moved upward to enable said bottom ends of said second pipes to move to top ends of said first pipes, respectively, said driving rack members respectively drive rotation of said driven gear members, which causes said carrier to rotate forward, downward and away from said front side of said main frame body and to bring said wheel members to displace away from said rear side of said main frame body thereby permitting said wheel members to roll forward or rearward, placing said frame mechanism in an expanded state and separating said driving rack members from said driven gear members.

3. The foldable cart as claimed in claim 1, wherein each of said first pipes has first positioning hole proximate to a top end of said first pipe, each of said second pipes having a second positioning hole proximate to said bottom end of said second pipe, each of said drive units further including a lock member that is mounted inside the corresponding one of said second pipes, said control mechanism further including an operating unit that is connected to and operates said lock members of said drive units to respectively move inside said second pipes, wherein, when said frame mechanism is in an expanded state, each of said second pipes extends upwardly from the respective one of said first pipes, such that said lock member of the corresponding one of said drive units is engaged to said first positioning hole in the corresponding one of said first pipes and said second positioning hole in the corresponding one of said second pipes to prevent the corresponding one of said second pipes from being movable relative to the corresponding one of said first pipes.

4. The foldable cart as claimed in claim 3, wherein each of said first pipes further has a first hole edge that bounds said first positioning hole, each of said second pipes further having a second hole edge that bounds said second positioning hole, said lock member having a hook portion that protrudes resiliently into said second positioning hole of the corresponding one of said second pipes, said hook portion having a bottom engaging segment, and a guide segment that extends upwardly and inclinedly from said bottom engaging segment, wherein, when said second positioning hole of each of said second pipes is in communication with said first positioning hole of the corresponding one of said first pipes, said hook portion of said lock member of the corresponding one of said drive units springs outward from said second positioning hole, and engages said first positioning hole, such that said bottom engaging segment of said hook portion abuts against said first hole edge of the corresponding one of said first pipes to prevent said second pipe from moving downward relative to the corresponding one of said first pipes, and when said lock member of each of said drive units is pulled upward, said guide segment of said hook portion slidably abutting against said second hole edge of the corresponding one of said second pipes, such that said hook portion is pressed inward to depart from said first positioning hole of the corresponding one of said first pipes and to allow downward movement of the corresponding one of said second pipes.

5. The foldable cart as claimed in claim 4, wherein said driving rack member of each of said drive units has an insertion portion that is inserted into said bottom end of the corresponding one of said second pipes, a push portion that is extended upwardly from said insertion portion, and a rack portion that extends downwardly from said insertion portion to mesh with said driven gear member, said insertion portion having a mounting space for said hook portion to be mounted resiliently therein, said hook portion further having a resilient straight segment that has an upper section abutting against said push portion, and a lower section resiliently bendable relative to said upper section and connected to said guide segment.

6. The foldable cart as claimed in claim 5, wherein said mounting space of said insertion portion has an upper compartment and a lower compartment communicated with said upper compartment, said bottom engaging segment and said guide segment of said hook portion of said lock member being disposed in said second compartment, each of said drive units further including a resilient member sleeved on said straight segment and disposed in said upper compartment to urge downward said hook portion.

7. The foldable cart as claimed in claim 1, wherein said driven gear member is rotatable about a rotation axis of said carrier, said driven gear member having a rotator body that is formed with a radial gear tooth to mesh with said driving rack member and a lever arm that extends radially from said rotator body to engage and rotate said carrier.

8. The foldable cart as claimed in claim 7, wherein said carrier has an engaging slot to receive engagingly said radial lever arm.

9. The foldable cart as claimed in claim 1, wherein said control mechanism further includes an operating unit that is connected to said driving rack members of said drive units and that is operable to move upward or downward said driving rack members.

10. The foldable cart as claimed in claim 9, wherein said main frame body further has a handle member that is connected to said second pipes and said operating unit.

11. The foldable cart as claimed in claim 10, wherein each of said drive units further includes a lock member disposed inside the corresponding one of said second pipes and engageable with the corresponding one of said first pipes to prevent the corresponding one of said second pipes from moving relative to the corresponding one of said first pipes.

12. The foldable cart as claimed in claim 11, wherein said lock members of said drive units are connected to said operating unit to move along with said driving rack members.

* * * * *